United States Patent [19]

La

[11] Patent Number: 5,675,138

[45] Date of Patent: Oct. 7, 1997

[54] NON-CONTACT ACTUATED TRIGGER APPARATUS FOR BAR CODE LASER SCANNER

[75] Inventor: Chay La, Rochester, N.Y.

[73] Assignee: PSC, Inc., Webster, N.Y.

[21] Appl. No.: 291,839

[22] Filed: Aug. 17, 1994

Related U.S. Application Data

[63] Continuation of Ser. No. 56,887, Apr. 2, 1993, abandoned.

[51] Int. Cl.$^6$ .................................................. G06K 7/10
[52] U.S. Cl. .................................................. 235/472; 235/462
[58] Field of Search .................................. 235/462, 472, 235/380

[56] References Cited

U.S. PATENT DOCUMENTS

| | | | |
|---|---|---|---|
| 3,806,874 | 4/1974 | Ehrat | 235/380 |
| 5,062,232 | 11/1991 | Eppler | 42/70.11 |
| 5,191,197 | 3/1993 | Metlitsky et al. | 235/472 |
| 5,212,372 | 5/1993 | Quick et al. | 235/472 |
| 5,250,790 | 10/1993 | Metlitsky et al. | 235/472 |

*Primary Examiner*—Harold Pitts
*Attorney, Agent, or Firm*—Foley & Lardner

[57] ABSTRACT

The system, which is especially suitable for use a a bar code scanner trigger which allows for hands-free scanner operation and non-contact triggering of the scanner by the operator, in one embodiment, comprises a switch and a switch actuator, with the switch mounted proximate to a movable part of the body, and the switch actuator located on the movable part of the body, which part is movable so as to move the switch actuator and switch to within a predetermined proximity of one another and thereby actuate the switch, which will actuate the electronic equipment switched thereby. After the switch has been actuated, moving the part of the body with the switch actuator thereon so as to move the switch actuator and switch beyond a predetermined proximity of one another will deactuate the switch, and thereby deactivate the electronic equipment switched thereby. In an exemplary embodiment, the switch actuator is disposed upon a finger via a switch actuator mount in the form of a glove, and the switch is disposed upon the back of the hand at a point proximate to the finger so that extending a finger as in a pointing motion actuates the switch, thereby activating the equipment and further so that retracting the finger deactuates the switch. In other embodiments multiple switches and switch actuators may be used in conjunction with multiple fingers or digits, and/or with predetermined patterns or combinations of switch actuations required to activate the electronic equipment.

25 Claims, 4 Drawing Sheets

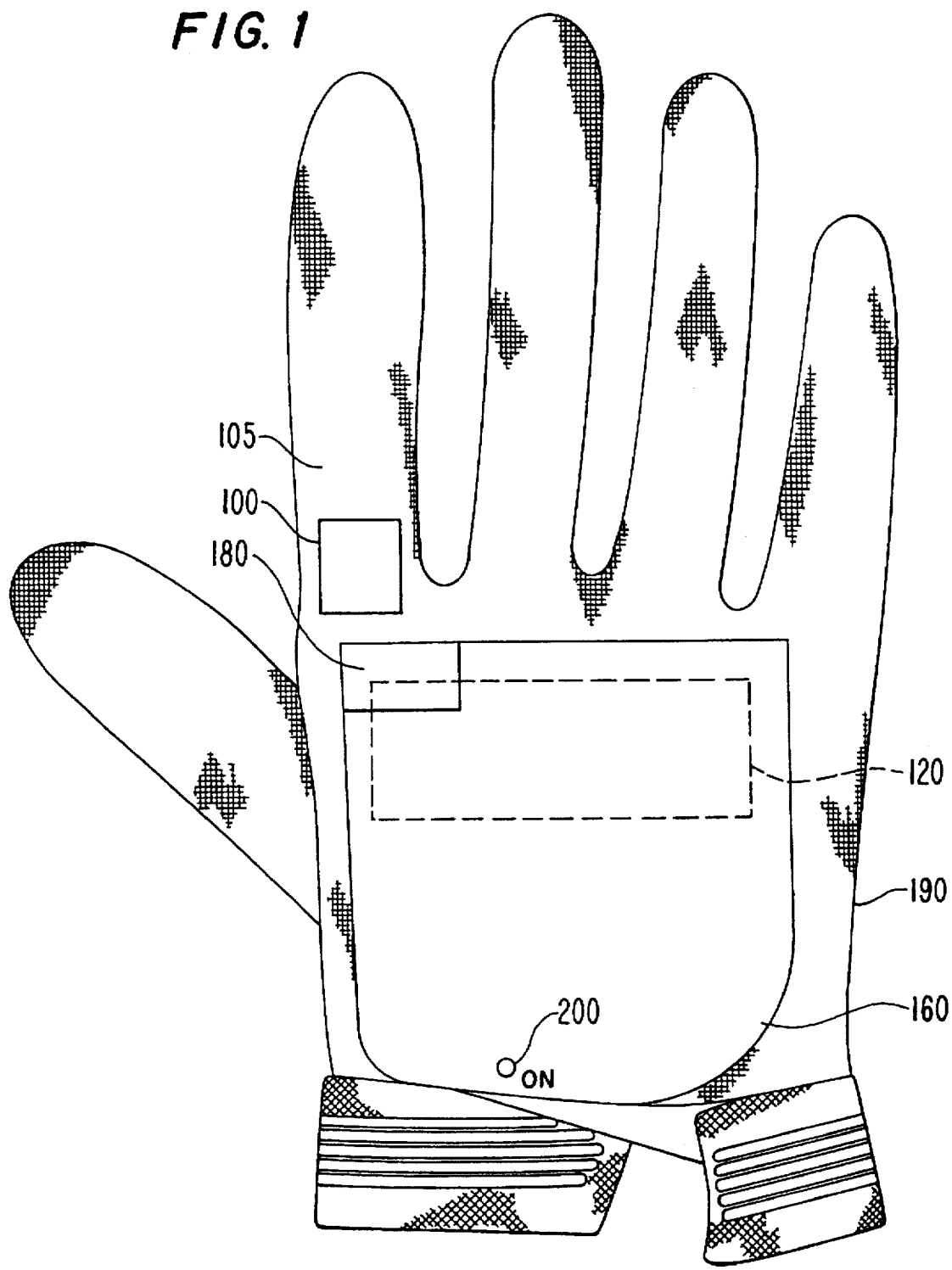

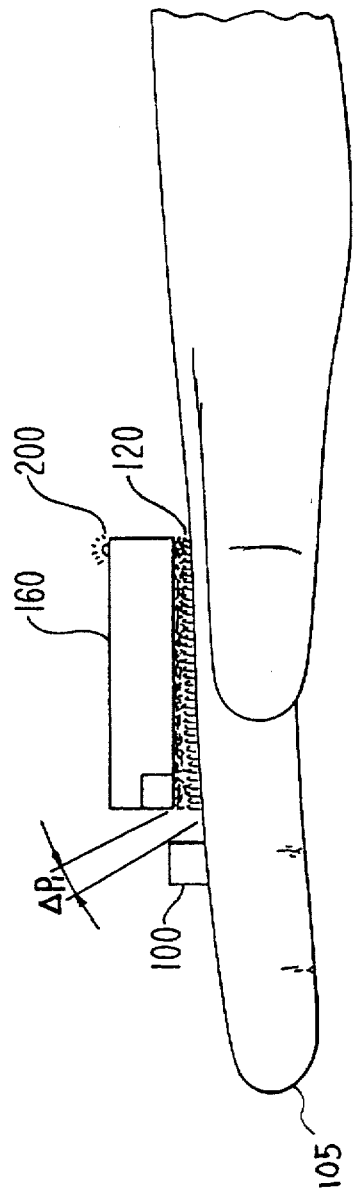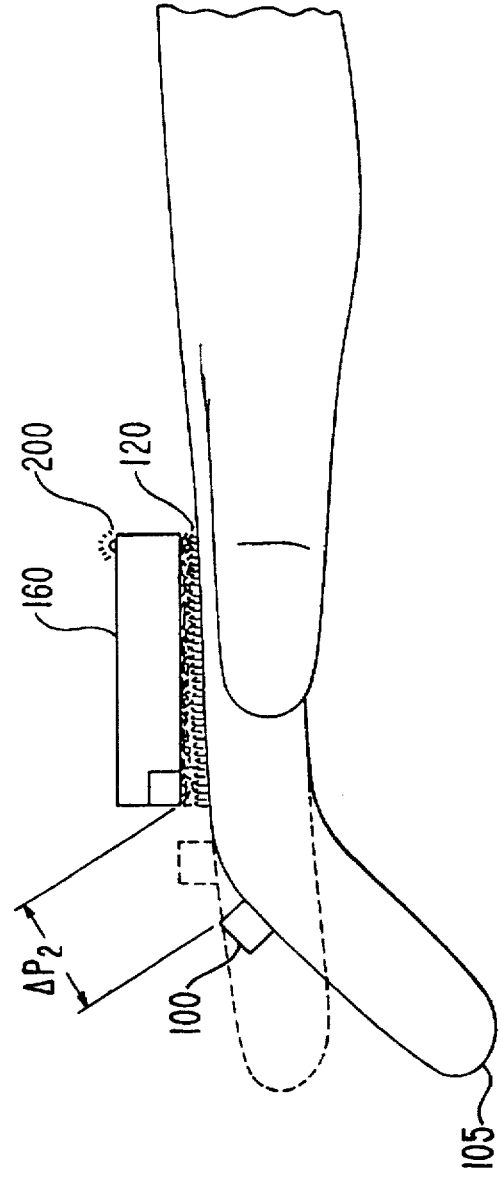

NON-CONTACT ACTUATED TRIGGER APPARATUS FOR BAR CODE LASER SCANNER

This application is a continuation of application Ser. No. 08/056,887, filed Apr. 2, 1993, now abandoned.

FIELD OF THE INVENTION

The present invention is in the field of bar code laser scanner trigger switches and is specifically a non-contact actuated proximity switching system for activating electronic equipment such as a bar code laser scanner which is hand-held or hand-mounted. The system, in one embodiment, comprises a switch and a switch actuator, with the switch mounted proximate to a movable part of the body, and the switch actuator located on the movable part of the body, which part is movable so as to move the switch actuator and switch to within a predetermined proximity of one another and thereby actuate the switch, which will activate the electronic equipment switched thereby. After the switch has been actuated, moving the part of the body with the switch actuator thereon so as to move the switch actuator and switch beyond a predetermined proximity of one another will deactuate the switch, and thereby deactivate the electronic equipment switched thereby. In an exemplary embodiment, the switch actuator is disposed upon a finger via a switch actuator mount in the form of a glove, and the switch is disposed upon the back of the hand at a point proximate to the finger so that extending a finger as in a pointing motion actuates the switch, thereby activating the equipment and further so that retracting the finger deactuates the switch. In other embodiments multiple switches and switch actuators may be used in conjunction with multiple fingers or digits, and/or with predetermined patterns or combinations of switch actuations required to activate the electronic equipment.

BACKGROUND

Operating electronic hardware typically requires some sort of manual contact with a switch or other actuation means. For portable hardware, it is desirable to provide a switch which may be operated by a slight articulation of the hand, so that the hand remains largely free for other tasks, such as grasping objects, etc. It is also desirable to provide a switch which prevents operator fatigue by requiring very little force to actuate. Such use of portable hardware involves the use of a laser bar code scanner in a warehouse, when an operator of a scanner may wish to carry or wear a portable scanner.

One approach has been to mount the switch and switch actuator near, but not actually on, the hand or fingers, and actuate the switch by direct pressure from the fingers. This first approach may be thought of as an "off-hand" approach; it typically uses a "button" switch with a switch actuator in the form of a 'button cap' and with a switch actuator such as an extension lever sometime connected thereto. Since the "off-hand" switch is not actually on the hand or fingers, it does not require cumbersome wiring about the fingers. However, the system of the off-hand approach is susceptible to inadvertent actuation; to prevent this it is necessary to mechanically bias the switch so that actuation requires deliberate exertion. Actuating (e.g., pressing) the button may be difficult; repeatedly actuating such a switch may lead to operator fatigue.

Another common approach been to locate the switch and switch actuator, not merely near the hand or fingers, but actually upon the hand or fingers, along with the switch actuator, if any, also mounted thereupon. This approach may be termed an "on-hand" approach. Such a switch is typically actuated via certain hand movements which move the switch actuator and thereby actuate the switch. While this 'on-hand' approach allows easy mounting of the switch, e.g. on a ring or glove, these switches are difficult to remove due to wiring connected to the fingers and hand, and are difficult to use without unintentionally actuating the switch via ordinary hand movements of normal hand use.

The present invention features a new approach, which may be thought of as a hybrid between the on-hand and off-hand approaches, is taken by the system according to the present invention, in which the switch is located near, but not on, the movable extremity (e.g. the hand) while the switch actuator is located, not merely near, but on, the movable extremity (e.g. hand). This provides all the advantages associated with both on-hand and off-hand systems, but does not provide any of the disadvantages of either on-hand or off-hand systems. The system according to the present invention provides a way of locating the switch near the hand, thereby avoiding the need for cabling to the hand, while providing wireless switch actuator on the hand, thereby eliminating the disadvantages associated with hand mounted switches, such as removal difficulty and unintentional switching by ordinary hand movements.

DESCRIPTION OF THE PRIOR ART

Many patents, including some very old, disclose hand-mounted switches. Some of the simplest patents disclose a glove in which electrical contacts mounted on the thumb and forefinger are brought into contact to complete a circuit energizing a lamp worn on the hand. This approach may be thought of as having a hand-mounted switch in its barest form, not enclosed by a switch actuator. Typical patents in this area include U.S. Pat. No. 1,165,970, issued to Harris in 1915, and U.S. Pat. No. 1,402,609, issued to Houdous in 1922. In addition to the above-mentioned disadvantages of on-hand mounting, this approach has the shock and fire hazard of exposed electrically energized contacts. Heidemann U.S. Pat. No. 1,173,269, discloses a thumb-depressible push buttons mounted on a glove with a wire extending therethrough and therefrom.

The disadvantages of on-hand mounting are present in approaches which mount both switch and a switch actuator on the finger, as in U.S. Pat. No. 5,045,650 issued to Suzuki. While the switch actuator here may reduce the force needed to actuate the switch, a device according to Suzuki would still be susceptible to unintentional actuation through ordinary use of the hand.

A modern example of switches for hand-held bar code scanner switches is Wike's U.S. Pat. No. 4,935,610 in which "[a] ring member comprising an on/off switch is mounted on the forefinger of the hand of the operator and operated by the thumb enabling the reader . . . " (Col. 1, lines 48–53) Wike suffers from the disadvantages of hand-mounted switches, as discussed above. Similar to Wike is O'Brien U.S. Pat. No. 4,722,625, which shows a forefinger-mounted switch used to power a painting system. Note that in O'Brien a wire need not go directly about the finger; however as the actuator is secured to the switch and must remain in contact therewith, O'Brien's actuator suffers from the above-discussed disadvantages; furthermore it is in physical contact with the switch. Both Wike and O'Brien suffer from the disadvantages of hand-mounted switches, as discussed above.

Another example of a bar code switch is Tierney's U.S. Pat. No. 4,766,299, disclosing a tension-detecting strap disposed about the hand and intended as a switch responsive to a "deliberate flexure of muscles in the hand" such as fist clenching or finger-pointing (Col. 1, lines 50–60). Though somewhat of a departure from other hand-mounted switches, Tierney's device suffers from the same disadvantages of the other hand-mounted switches, namely, susceptibility to unintentional switching and having cumbersome wiring. Moreover, this approach is operable only as a toggle switch, i.e., making a gesture turns the laser on, and "the laser may be turned off by repeating the same gesture." (Col. 2, lines 45–55) Between 'gestures' Tierney's laser remains in the same state. This is quite unlike the present invention, which as will be seen, requires making and maintaining gestures in order to initiate and maintain an activated state.

Yet another prior art attempt to solve this problem, similar to that used in Newton's U.S. Pat. No. 1,197,652, is the "GLADIATOR" manufactured by Symbol Technologies, Inc., of Bohemia, N.Y. The Gladiator is an arm-mounted unit having switches with switch actuators (buttons) shaped to receive the top of the fingers. The Gladiator is activated by straightening the fingers so that the fingers' top may actuate a switch located on the underside of the unit. The GLADIATOR is seen to have the disadvantages of "off-hand" switches—difficult motions are required to actuate it, this will lead to operator fatigue, especially if the actuators are mechanically biased to resist accidental actuation. This approach is as unwieldy as it is old; it is noted that this approach is, issued on a hand signaling device.

A switch for a bar-code trigger is shown in U.S. Pat. No. 5,191,197 (the '197), issued to Metlitsky, et. al. In '197, both switch and switch actuator are located off the hand, thereby apparently leaving the hand without cabling thereon or thereto, and while leaving the hand free for use. In one embodiment, the actuator is an outwardly projecting lever which may be actuated by the thumb; in another embodiment, the actuator is a hinge-like lever mounted near the wrist which is actuated by moving the hand at the wrist. This off-hand approach suffers the disadvantages common to the off-hand approach. In addition, its actuator is susceptible to false triggering by ordinary hand movements.

It is a feature of the present invention to obviate a number of disadvantages of the above-disclosed devices, including: requiring excessive pressure to operate; having moving parts; being electrically unsafe; requiring awkward cabling about the hand and/or fingers; being susceptible to unintentional actuation by ordinary hand movements or through contact with other surfaces or objects.

For further background, reference may be made to U.S. patent application Ser. No. 756,636, filed Sep. 9, 1991 now U.S. Pat. No. 5,212,372, issued May 18, 1993 for a finger actuated bar code scanning system & translator terminal which uses a glove worn by the operator.

BRIEF DESCRIPTION OF THE DRAWINGS

FIG. 1 depicts a top view of one embodiment of the apparatus used according to one embodiment of the present invention.

FIGS. 2A & 2B depict side views of the embodiment of the apparatus shown in FIG. 1 in different operating positions.

DETAILED DESCRIPTION

Figure 3:
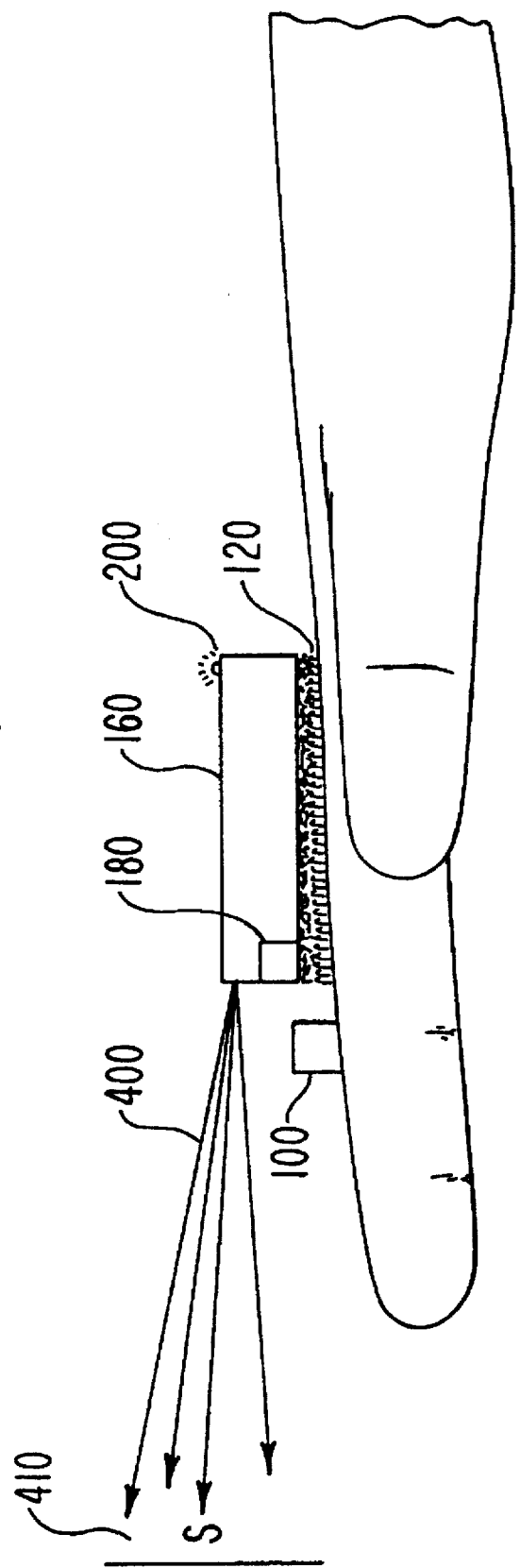
FIG. 3 depicts the apparatus shown in FIGS. 1 & 2 used to scan a target.

Referring to FIG. 1, a switch actuator 100 is mounted upon a movable extremity, the index finger 105, by an adhesive, or may be integrated into a glove 190 as by sewing. Switch actuator 100 has no wires connected thereto and may be a magnet. It will be seen that there is no electrical contact between the switch actuator 100 and a switch 180 which is actuated thereby; there need not be any physical contact between them as well as no electrical contact.

Switch actuator 100 is mounted so as to be available for actuation of switch 180. Switch 180 is effectively a proximity switch, which is actuated whenever switch actuator 100 and switch 180 are brought to within a predetermined proximity relative to one another. When switch 180 and switch actuator 100 are brought to a point outside a predetermined proximity relative to one another, the switch 180 is deactuated. Switch 180 detects the proximity of switch actuator 100. When switch actuator 100 is a magnet, switch 180 is typically a magnetically-operated switch, such as a reed or Hall-effect switch. The switch 180 is electrically connected to the electronic equipment 160 to be activated, and may also be physically connected thereto; in the illustrated embodiment, the switch 180 is mounted upon a printed circuit board of the equipment 160. Alternatively the switch 160 may be mounted upon any structure in the interior of a case containing the equipment 160, or upon the case itself. The proximity distance between the actuator and the switch for switch actuation may be determined by the strength of the magnetic field and/or the sensitivity of the Hall effect sensor or the reed switch.

The electronic equipment 160, which contains switch 180, is mounted entirely on the back of the glove 190, for example by a hook-and-loop fastener patch 120 with locking halves which are affixed to glove 190 at 120, and to electronic equipment 160, so as to permit easily and detachably mounting the electronic equipment 160 on the glove 190.

Operation of the system of the present invention is better understood by reference to FIGS. 2A & 2B. In a normal, resting, non-actuated state, illustrated in FIG. 2B, the operator's fingers 105 are relaxed, being slightly curled, and the switch 180 and the switch actuator 100 are spaced apart a distance Delta-P-2, which is greater than the distance of the proximity required for actuation.

To actuate the switch, the operator merely straightens out his finger 105, moving it into the position of FIG. 2A, in which switch actuator 100 and switch 180 are apart by only a distance Delta-P-1, which is within the proximity required for actuation. Thus, Switch 180 is actuated, and the electronic equipment 160, which may comprise LED 200, will be activated. To deactuate the switch, the operator merely relaxes his hand such that the finger 105 again curls slightly, moving the switch actuator 100 and switch 180 apart, beyond the proximity required for actuation.

Although a finger 105 is shown as an example, it is noted that according to the system of the present invention switch actuator 100 could be positioned at another place, e.g. upon the operator's lapel, etc. and that electronic equipment 160 could also be positioned in yet another place with actuation of the switch 180 still provided in the same way by switch actuator 100. An other example of alternative placement (not shown for clarity), the switch 180 could be located on the hip, and the switch actuator 100 on the wrist.

Figure 4:
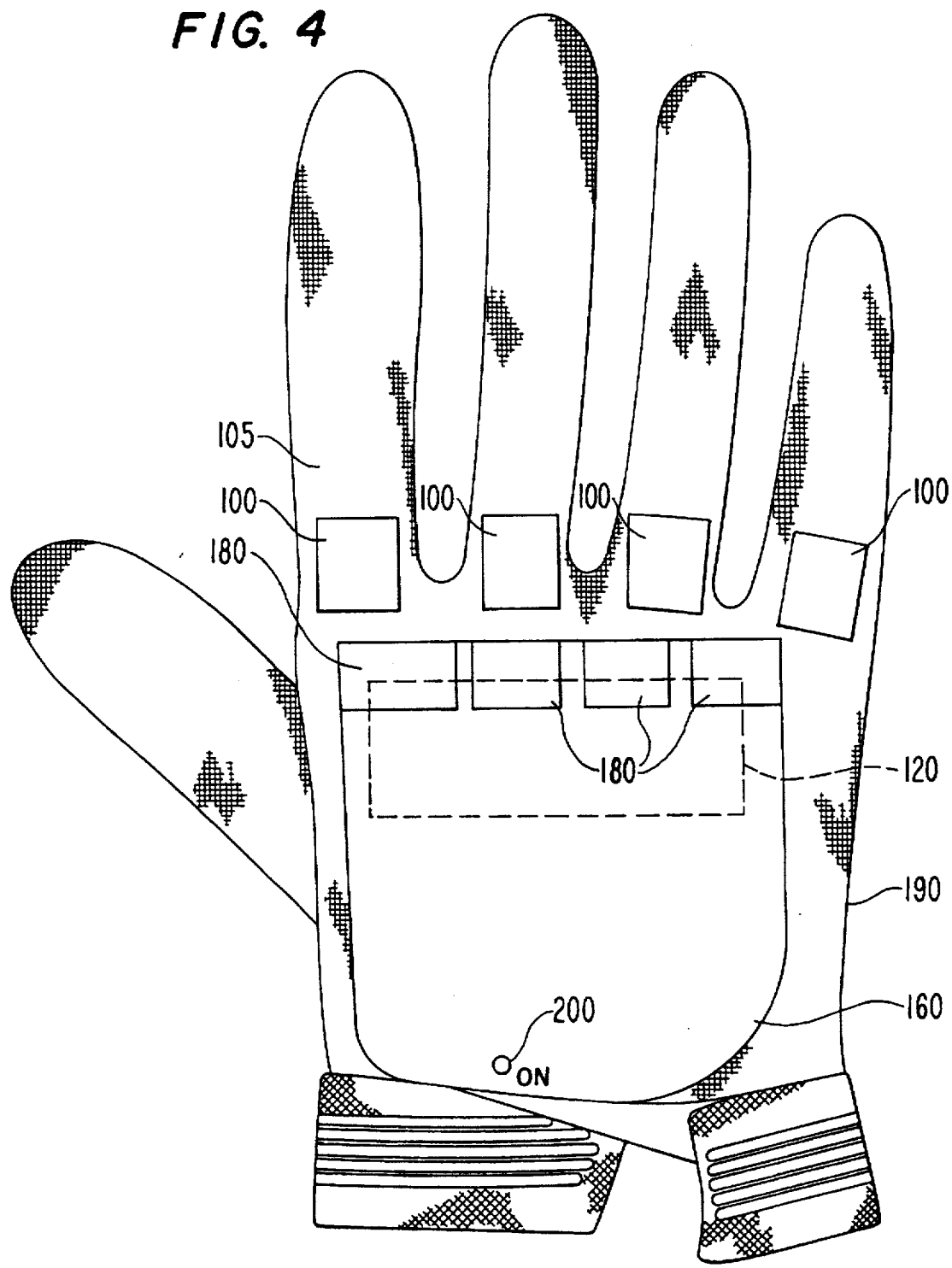
FIG. 4 depicts an embodiment of the instant invention having a plurality of switches and switch actuators.

In the most common applications, a single actuation of a single switch with a single actuator will activate the electronic equipment. For other applications, a more complex pattern or repetition of actuations could be required to actuate the equipment. For example, two repeated actuations might be required in a short time-frame, as when "double-clicking" a computer mouse button. For still other applications, a plurality of switches 180 and corresponding switch actuators 100 could according to the present invention be disposed on various digits (see FIG. 4) and configured such that they must be actuated in a certain fashion in order to activate the electronic equipment. For example, a particular system might require an actuation of one switch followed by an actuation of another switch, followed by repeated actuation of yet another switch, before the electronic equipment were activated. Quite similarly, such "actuation combinations" could be employed to initiate various functions within the electronic equipment, rather than merely activating and deactivating it.

FIG. 3 depicts an operator using the system according to the present invention to activate a hand-mounted laser bar code scanner which is the equipment 160 and use it to scan a target 410. Note that the operator's fingers 105 are extended so that switch actuator 100 and switch 180 are within the proximity required for switch actuation; thus, switch 180 is actuated and electronic equipment 160, in this case a laser scanner, is activated. By pointing at a bar code target 410, the operator will direct scanning laser beams 400 across the target 410.

Variations and modifications within the scope of the invention will undoubtedly become apparent to those skilled in the art. Accordingly, the foregoing description should be taken as illustrative and not in a limiting sense.

I claim:

1. A system for activating a bar code scanner, said system comprising:
    a switch, electrically connected to said bar code scanner, for activating said bar code scanner when actuated; and
    a switch actuator;
    said switch being actuated and said bar code scanner being activated to begin bar code scanning when said switch and said switch actuator are brought within a predetermined proximity to each other without making relative contact;
    wherein said switch and said switch actuator are both attached to a human body.

2. The system as claimed in claim 1 wherein said switch actuator comprises a magnet and wherein said switch is actuated by a magnetic field from said magnet.

3. The system as claimed in claim 2 wherein said switch actuator is disposed upon an extremity of the human body by means of a switch actuator mount.

4. The system as claimed in claim 3 wherein said switch actuator is disposed upon a hand.

5. The system as claimed in claim 4 wherein said switch actuator is disposed on at least one digit of a finger of the hand.

6. The system as claimed in claim 5, further comprising a glove worn on the hand an having receptacles for fingers for carrying said switch and said switch actuator.

7. The system as claimed in claim 1 further comprising means for integrally mounting said switch with said bar code scanner.

8. The system as claimed in claim 1 wherein said switch is disposed upon an extremity of the human body.

9. The system as claimed in claim 8 wherein said switch is disposed upon the hand, said hand being said extremity.

10. The system as claimed in claim 1, wherein said switch actuator is carried on a digit of a finger and said switch actuator and said switch are brought within said predetermined proximity to each other by moving the digit upon which said actuator is carried.

11. The system as claimed in claim 10 wherein said switch is deactuated upon moving said switch actuator and said switch out of said predetermined proximity to each other by moving the digit upon which said switch actuator is disposed.

12. The system as claimed in claim 1 wherein said switch is deactuated upon moving said switch actuator and said switch out of said predetermined proximity to each other, thereby deactivating said bar code scanner.

13. The system as claimed in claim 12 wherein said switch actuator is disposed upon a glove having a switch actuator mount, and wherein said bar code scanner is connected on a back side of a hand and spaced a sufficient distance to position said switch and said switch actuator outside said predetermined proximity to each other, but close enough so that they may easily be brought within said predetermined proximity to each other by flexing a portion of said hand.

14. The system as claimed in claim 13 wherein said switch actuator mount comprises a part of said bar code scanner and has interlocking halves of a hook-and-loop fastener, one of said halves of said hook-and-loop fastener being affixed to said bar code scanner and the other to said glove on the portion thereof which receives the back side of said hand to permit easy and detachable mounting on said glove.

15. The system as claimed in claim 14 wherein said switch actuator is a magnetic field generator.

16. The system as claimed in claim 15 wherein said switch is selected from the group consisting of a magnetic reed switch and a Hall-effect switch.

17. A system for activating electronic equipment, said system comprising:
    at least one switch;
    at least one switch actuator; and
    a glove having receptacles for fingers for carrying said switch and said switch actuator, said switch disposed on a back side of said glove and said switch actuator disposed on one of said fingers;
    said switch being actuated when said switch and said switch actuator are brought within a predetermined proximity to each other without making relative contact.

18. The system as claimed in claim 17, wherein said switch is deactuated when said switch and said switch actuator are moved out of said predeterined proximity to each other.

19. The system as claimed in claim 17, wherein said equipment is activated after a single actuation.

20. The system as claimed in claim 17, wherein said equipment is activated after a predetermined number of actuations within a predetermined time.

21. The system as claimed in claim 17, wherein said glove carries more than one said switch and more than one said switch actuator and wherein said equipment is activated after a predetermined combination of actuations among said switches.

22. A system for activating various functions of electronic equipment, said system comprising:
    at least one switch;
    at least one switch actuator; and
    a glove having receptacles for fingers for carrying said switch and said switch actuator, said switch disposed on a back side of said glove and said switch actuator disposed on one of said fingers;
    said switch being actuated when said switch and said switch actuator are brought within a predetermined proximity to each other without making relative contact.

23. The system as claimed in claim 22, wherein said switch is deactuated when said switch and said switch actuator are moved out of said predeterined proximity to each other.

24. The system as claimed in claim 22, wherein said activation of each of various functions of said equipment corresponds to a predetermined number of actuations within a predetermined time.

25. The system as claimed in claim 22, wherein said glove carries more than one said switch and more than one said switch actuator and wherein said activation of each of various functions of said equipment corresponds to a predetermined combination of actuations among said switches.

* * * * *